US011207234B2

(12) United States Patent
Sawicki et al.

(10) Patent No.: US 11,207,234 B2
(45) Date of Patent: Dec. 28, 2021

(54) ACTUATING DEVICE FOR POWERED ORTHOSIS

(71) Applicant: Cleveland State University, Cleveland, OH (US)

(72) Inventors: Jerzy T. Sawicki, Westlake, OH (US); Curt A. Laubscher, Olmsted Township, OH (US); Ryan J. Farris, Hartville, OH (US); Steven J-S Etheridge, Tallmadge, OH (US)

( * ) Notice: Subject to any disclaimer, the term of this patent is extended or adjusted under 35 U.S.C. 154(b) by 454 days.

(21) Appl. No.: 15/485,962

(22) Filed: Apr. 12, 2017

(65) Prior Publication Data

US 2018/0296422 A1 Oct. 18, 2018

(51) Int. Cl.
*H02K 11/33* (2016.01)
*H02K 11/20* (2016.01)
(Continued)

(52) U.S. Cl.
CPC ............... *A61H 3/00* (2013.01); *A61H 1/024* (2013.01); *A61H 1/0244* (2013.01); *F16H 19/005* (2013.01); *A61H 2001/0248* (2013.01); *A61H 2201/0107* (2013.01); *A61H 2201/1207* (2013.01); *A61H 2201/1215* (2013.01); *A61H 2201/149* (2013.01); *A61H 2201/1436* (2013.01); *A61H 2201/1454* (2013.01); *A61H 2201/1463* (2013.01); *A61H 2201/1472* (2013.01); *A61H 2201/164* (2013.01); *A61H 2201/165* (2013.01); *A61H 2201/1642* (2013.01); *A61H 2201/1671* (2013.01); *A61H 2201/1673* (2013.01); *A61H 2201/5005* (2013.01); *A61H 2201/5058* (2013.01); *A61H 2201/5064* (2013.01); *A61H 2201/5084* (2013.01); *A61H 2205/106* (2013.01); *A61H 2205/108* (2013.01); *F16H 7/023* (2013.01);
(Continued)

(58) Field of Classification Search
CPC ...................... A61H 2201/08; A61H 2201/106
See application file for complete search history.

(56) References Cited

U.S. PATENT DOCUMENTS 6,324,934 B1 12/2001 Monaghan
9,447,849 B1 9/2016 Edsinger et al.
(Continued)

OTHER PUBLICATIONS

International Search Report and Written Opinion for corresponding PCT Application No. PCT/US2018/027300 dated Jun. 21, 2018.

*Primary Examiner* — Kawing Chan
*Assistant Examiner* — Charles S Laughlin
(74) *Attorney, Agent, or Firm* — Calfee, Halter & Griswold LLP

(57) ABSTRACT

An actuating device for orthosis includes a transmission that is operatively connected to a motor such that the motor provides power to the transmission. The transmission includes a first stage, a second stage, and a third stage. Each of these stages includes at least two sprockets and a drive belt tensioned between the two sprockets. The transmission also includes a first shaft and a second shaft. A sprocket of each of the first, second, and third stages of the transmission is attached to the first shaft. An actuating arm is operatively connected to the third stage of the transmission such that the power provided to the transmission by the motor causes the actuating arm to provide an output torque.

22 Claims, 5 Drawing Sheets

(51) Int. Cl.
    *A61H 3/00*       (2006.01)
    *F16H 19/00*    (2006.01)
    *A61H 1/02*       (2006.01)
    *F16H 7/08*       (2006.01)
    *F16H 7/02*       (2006.01)

(52) U.S. Cl.
    CPC .......... *F16H 7/08* (2013.01); *F16H 2007/087* (2013.01); *F16H 2007/0891* (2013.01)

(56) References Cited

U.S. PATENT DOCUMENTS

| | | |
|---|---|---|
| 2013/0197408 A1 | 8/2013 | Goldfarb et al. |
| 2014/0142475 A1 | 5/2014 | Goldfarb et al. |
| 2015/0084559 A1* | 3/2015 | Hirata ................ H02P 6/16 318/400.13 |
| 2015/0142130 A1* | 5/2015 | Goldfarb ............ A61H 1/024 623/25 |
| 2015/0150747 A1 | 6/2015 | Sankai |
| 2015/0209159 A1 | 7/2015 | Goldfarb et al. |
| 2015/0374573 A1* | 12/2015 | Horst .................. A61F 5/0125 602/16 |
| 2016/0136031 A1 | 5/2016 | Cestari Soto et al. |
| 2016/0206498 A1 | 7/2016 | Kazerooni et al. |
| 2016/0287414 A1 | 10/2016 | Goldfarb et al. |
| 2018/0360639 A1* | 12/2018 | Gregg ................. B25J 9/0006 |

\* cited by examiner

1

ACTUATING DEVICE FOR POWERED ORTHOSIS

BACKGROUND

Temporary or permanent injuries or disabilities, or both, may affect a person's ability to walk, especially with a healthy gait. To help rehabilitate or assist such persons to walk with a healthy gait, a lower limb orthosis is used to provide torque to the lower limbs (e.g., hips, knees, etc.) of an individual.

SUMMARY

According to an exemplary embodiment of the present invention, an actuating device for orthosis includes a housing, a motor disposed in the housing, a transmission disposed in the housing, and an actuating arm. The transmission is operatively connected to the motor such that the motor provides power to the transmission. The transmission includes a first stage, a second stage, and a third stage. The first stage has a first sprocket, a second sprocket, and a first drive belt tensioned between the first sprocket and the second sprocket. The first sprocket is attached to a shaft of the motor. The second stage has a third sprocket, a fourth sprocket, and a second drive belt tensioned by the third sprocket and the fourth sprocket. The third sprocket is attached to the second sprocket of the first stage. The third stage has a fifth sprocket, a sixth sprocket, and a third drive belt tensioned by the fifth sprocket and the sixth sprocket. The fifth sprocket is attached to the fourth sprocket of the second stage. The transmission additionally includes a first shaft and a second shaft. The second sprocket, the third sprocket, and the sixth sprocket are attached to the first shaft, and the fourth sprocket and the fifth sprocket are attached to the second shaft. The actuating arm is operatively connected to the sixth sprocket of the third stage of the transmission such that the power provided to the transmission by the motor causes the actuating arm to provide an output torque.

According to another exemplary embodiment of the present invention, an actuating device for orthosis includes a housing, a motor disposed in the housing, a transmission disposed in the housing, and an actuating arm. The transmission is operatively connected to the motor such that the motor provides power to the transmission. The transmission includes a first shaft, a second, a first stage having a first drive belt, a second stage having a second drive belt, and a third stage having a third drive belt. The first drive belt is connected to a shaft of the motor and the first shaft of the transmission. The second drive belt is connected to the first and second shafts of the transmission. The third drive belt is connected to the first and second shafts of the transmission. The actuating arm is operatively connected to the third stage of the transmission such that the power provided to the transmission by the motor causes the actuating arm to provide an output torque. A distance between the shaft of the motor and the first shaft of the transmission is adjustable. In addition, a distance between the first shaft and the second shaft of the transmission is also adjustable.

According to another exemplary embodiment of the present invention, an actuating device for orthosis includes a housing, a motor disposed in the housing, a transmission disposed in the housing, and an actuating arm. The transmission is operatively connected to the motor such that the motor provides power to the transmission. The transmission is backdrivable. The actuating arm is operatively connected to the transmission such that the power provided to the transmission by the motor causes the actuating arm to provide an output torque.

DETAILED DESCRIPTION

Figure 1B:
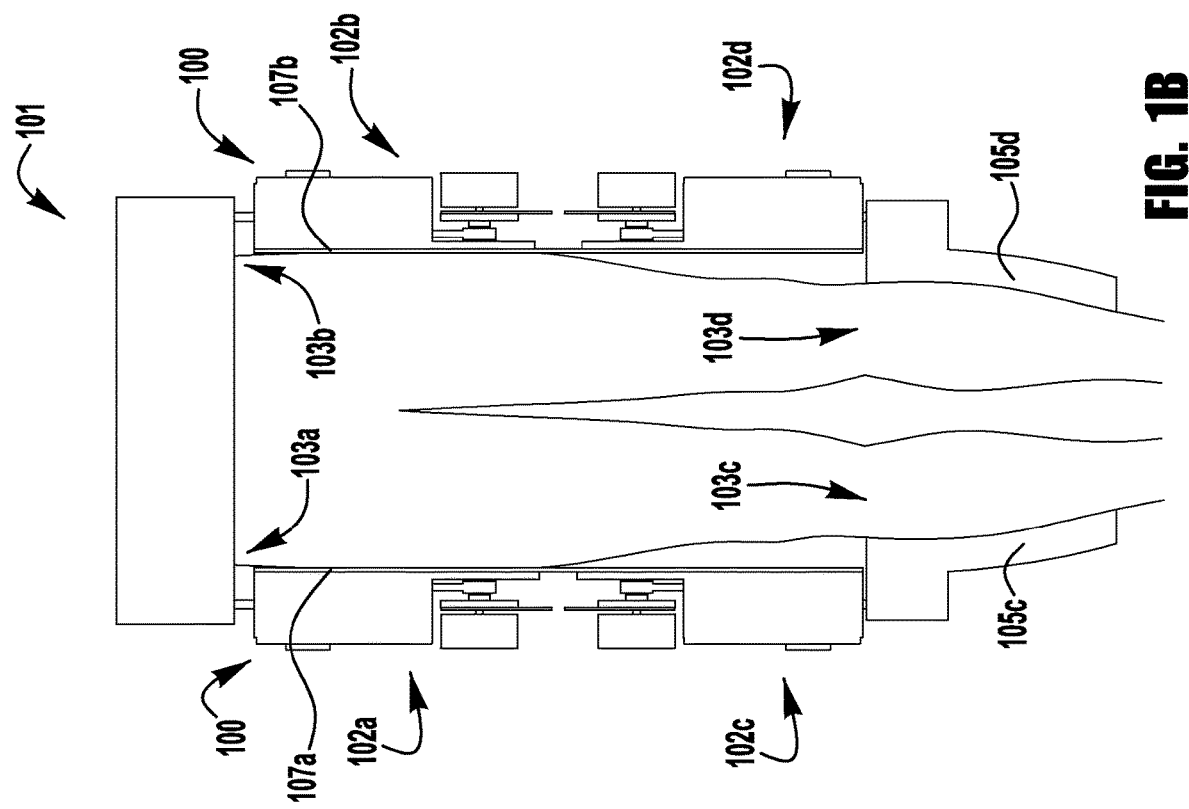
FIGS. 1A and 1B illustrate a left side view and a front view, respectively, of a user with a powered lower limb orthosis.

The following describes exemplary embodiments according to the general inventive concepts and is not intended to limit the scope of the claims in any way. The terms used in the claims have their full ordinary meaning.

While certain exemplary embodiments described herein and illustrated in the drawings relate to an actuator for powered lower limb orthosis, it should be understood that many of the inventive features described herein may be applied to other devices, systems, and methods. For example, the features described herein may be utilized in other types of orthosis, including upper limb orthosis, or other electrically powered devices, including service robots.

The present application is directed to an actuating device for a powered lower limb orthosis that is configured to rehabilitate or assist a person who is walking impaired. A lower limb orthosis is a device used to help assist, rehabilitate, and/or improve disorders of a person's lower limbs (e.g., a person's hip or knee). In certain embodiments, an orthosis utilizing the actuating device may be configured to provide assistive or rehabilitative torque to the lower limbs of the user. Also, the orthosis may be configured to provide torque to aid a paralyzed or otherwise disabled person in walking.

An orthosis may include one or more actuating devices (also called "cassettes" or "cartridges") that are configured to supply torque to the hip(s), knee(s), ankle(s), or any combination of the hip(s), knee(s), and ankle(s) of a user. In certain embodiments, the actuating device aids in rehabilitating a user's gait by guiding the user's walking to a healthy gait. In addition, the actuating device may be configured to assist a walking user by decreasing the user's necessary exertion on one or more limbs of the user. In an exemplary embodiment, the actuating device may be configured to aid and assist the gait of the walking impaired pediatric population (i.e., children between the ages 6 and 11). However, the actuating device may be used in several other applications that require the described features, such as, for example, providing performance improving torque to the lower limbs of healthy individuals, as a joint actuator in an upper limb orthosis where quiet operation is needed, as a joint actuator in service robots where quiet operation is needed, or any other suitable application.

The actuating device of the present application provides a powered lower limb orthosis with several advantages over existing lower limb orthosis. For example, in one embodiment, the actuating device has a three stage toothed belt transmission powered by a brushless DC motor that controls an actuating arm. In certain embodiments, the second and third stages may be collocated, which allows multiple pulleys on the same axis to spin at different rates and reduce the overall footprint of the actuator. In addition, the actuating device may be backdrivable (i.e., the transmission and motor may be driven when torque is externally applied to the actuating arm), which allows for a user-in-charge mode of control. The backdrivability of the system allows for more variety in gait patterns on a per-subject basis and makes the actuating device highly efficient. Moreover, the toothed belt transmission allows for a quiet operation of the actuating device. In certain embodiments, the actuating device may be configured to be lightweight and compact, which makes an orthosis utilizing the actuating device advantageous to the pediatric population. Also, the actuating device may be self-contained and modular, which eases servicing and allows an actuating device to be placed at any joint.

Figure 1A:
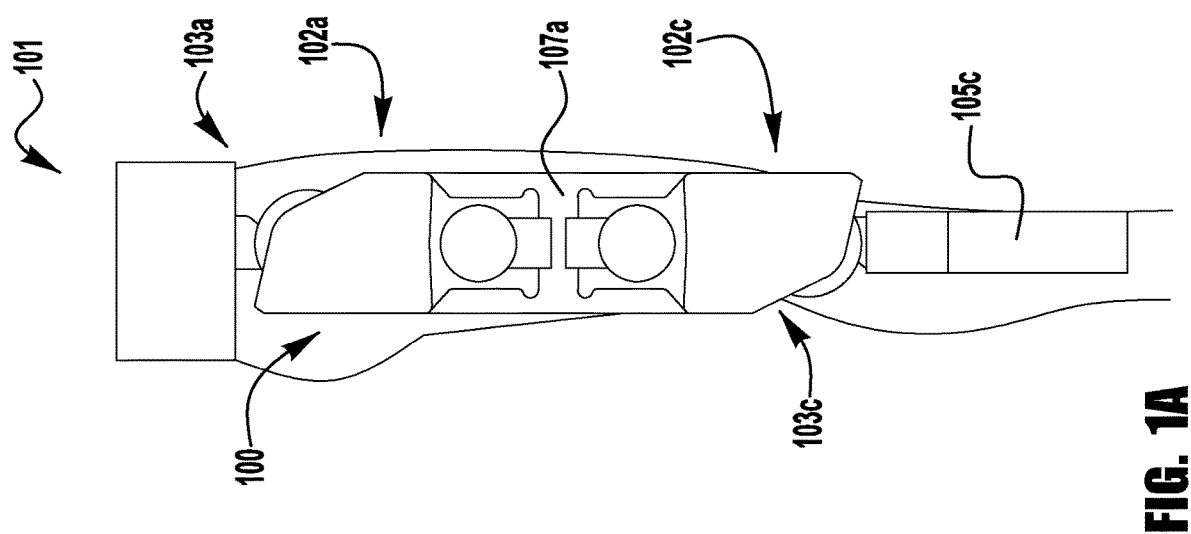

Referring to FIGS. 1A and 1B, a lower limb orthosis 100 is shown attached to a user 101. The illustrated orthosis includes four actuating devices 102a-d. The orthosis 100 is configured to engage the user's 101 right hip 103a, left hip 103b, right knee 103c, and left knee 103d. More particularly, the first actuating device 102a is configured to engage the right hip 103a, the second actuating device 102b is configured to engage the left hip 103b, the third actuating device 102c is configured to engage the right knee 103c, and the fourth actuating device 102d is configured to engage the left knee 103d. Although the illustrated embodiment of the orthosis 100 has four actuating devices 102a-d, other embodiments of an orthosis may include one actuating device, two actuating devices, three actuating devices, four actuating devices, five actuating devices, etc. Each actuating device is configured to engage and move one or more components of the orthosis 100. For example, actuating device 102c is configured to engage and move component 105c of the orthosis 100, which causes component 105c to provide torque to the right knee 103c of the user. In another example, actuating device 102d is configured to engage and move component 105d of the orthosis 100, which causes component 105d to provide torque to the left knee 103d of the user. In the illustrated embodiment, the lower limb orthosis 100 includes a first attachment component 107a and a second attachment component 107b. The first attachment component 107a is configured to attach the first actuating device 102a and the third actuating device 102c to the lower limb orthosis 100. The second attachment component 107b is configured to attach the second actuating device 102b and the fourth actuating device 102d to the lower limb orthosis 100. The first and second attachment components 107a, 107b can be configured to attach one or more actuating devices to the lower limb orthosis 100.

Figure 2:
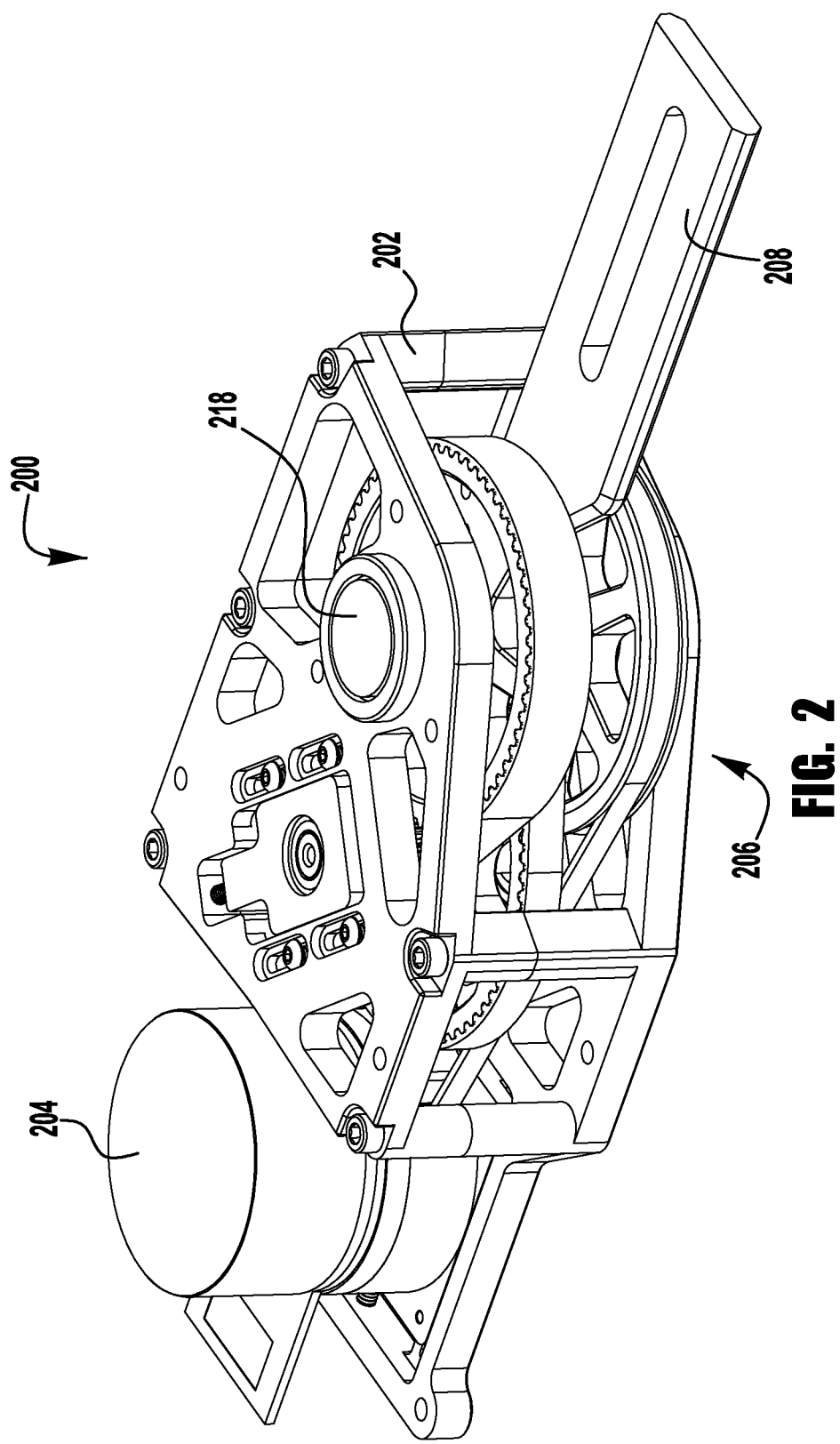
FIG. 2 is an isometric view of an exemplary embodiment of an actuating device that may be used with powered lower limb orthosis.

Referring to FIG. 2, an exemplary embodiment of an actuating device 200 includes a housing 202, a motor 204, a transmission 206, and an actuating arm 208. The motor 204 is configured to provide power to the transmission 206, and the transmission is configured to move the actuating arm 208, which engages components (e.g., components 105c and 105d shown in FIG. 1) of an orthosis (e.g., the orthosis 100 shown in FIG. 1) to provide torque to the limbs of a user.

Any suitable motor 204 may be used, such as, for example, a brushless DC motor, a brushed DC motor, a pneumatic motor, etc. Any suitable transmission 206 may be used, such as, for example, a toothed belt transmission, a toothless belt transmission, a chain transmission, a gear transmission, etc. Although the illustrated embodiment of the transmission 206 has three stages, alternative embodiments of the transmission may have one stage, two stages, three stages, four stages, etc. Any suitable actuating arm may be used, such as, for example, a bar, a rod, an extension of shaft 322, gears, etc. The actuating arm 208 may be made of, for example, aluminum, plastic, steel, etc.

In certain embodiments, the motor 204 has a controller (not shown) that is used to control the performance of the motor. For example, the controller may be used to start and stop the motor 204, regulate the speed of the motor, and/or regulate the torque of the motor. The motor 204 may be controlled by using measurements of the motor's current. In addition, in certain embodiments, the motor houses Hall effect sensors (not shown) that are used for feedback in motor control. In addition, in certain embodiments, the actuating device 200 includes a joint position sensor 218 that is used to determine the position of the actuating arm 208 for feedback in motor control. The Hall effect sensors and joint position sensor 218 allow the controller of the motor 204 to adjust the performance of the motor based on the speed of the motor, the position of the actuating arm 208, or both. The joint position sensor 218 may be, for example, a magnetic field sensor, an optical rotary encoder, rotary type resistive sensors, rotary type capacitive sensors, etc. In alternative embodiments, the position of the actuating arm can be inferred from other measurements, such as, for example, the velocity of the motor 204 using Hall effect sensors, the linear acceleration of the orthosis limb(s) using accelerometers, the angular acceleration of the orthosis limb(s) using gyroscopes, etc.

Figure 3:
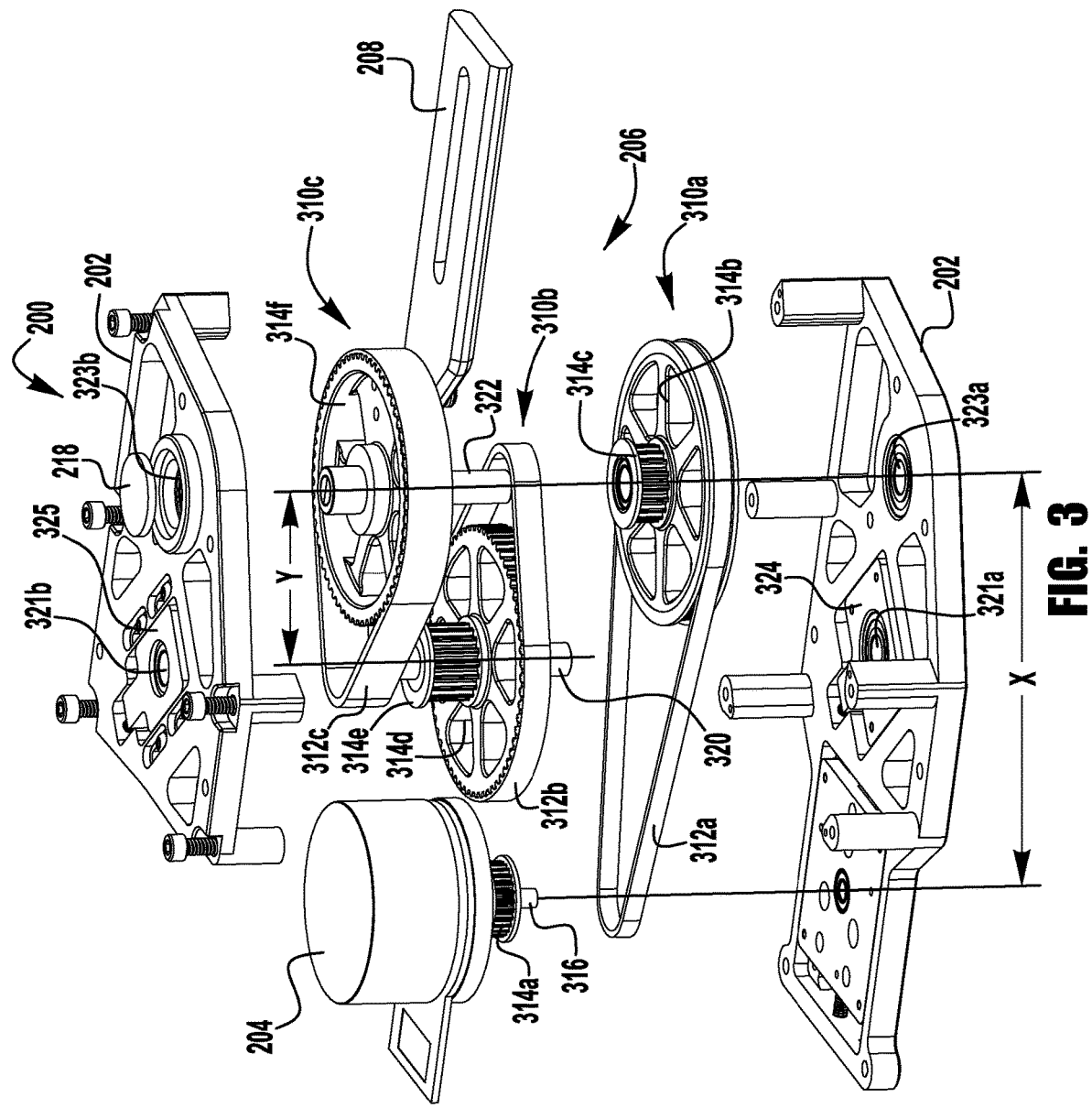
FIG. 3 is an exploded view of the exemplary embodiment of the actuating device of FIG. 2.
Figure 4:
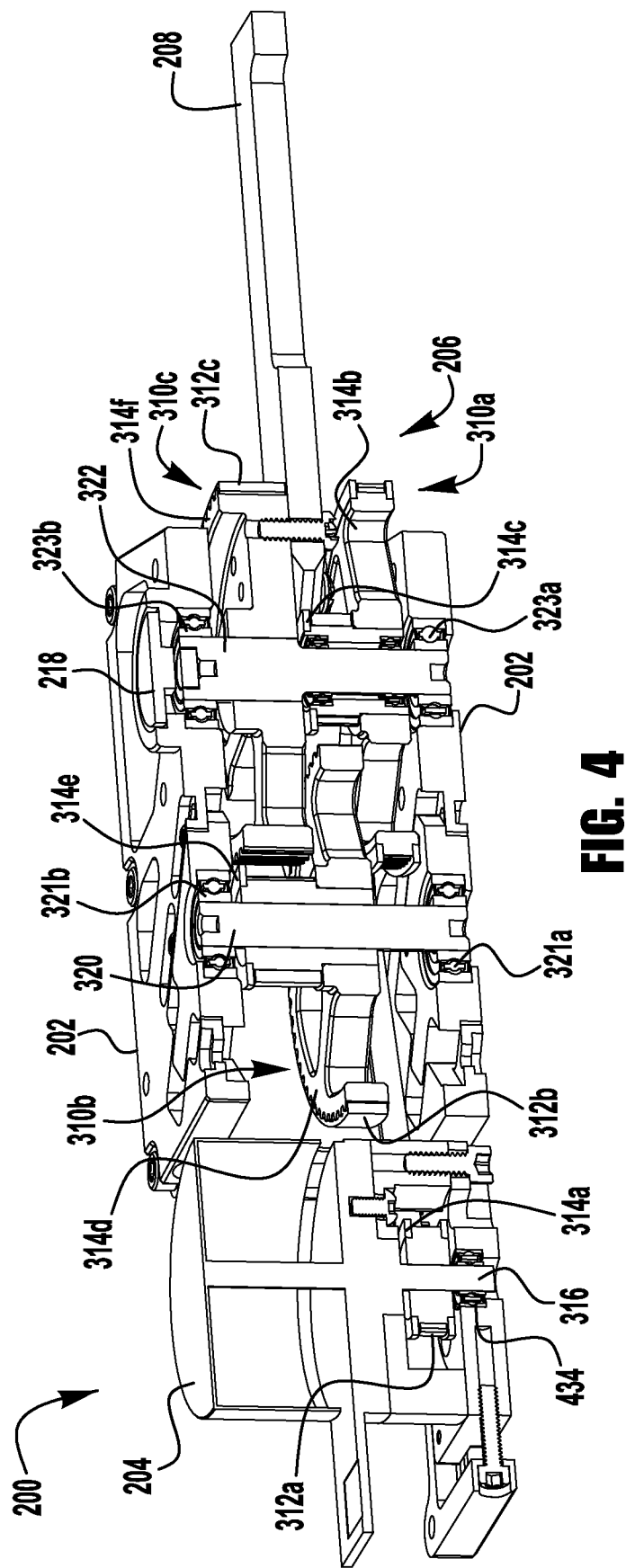
FIG. 4 is a cross-sectional view of the exemplary embodiment of the actuating device of FIG. 2.

Referring to FIGS. 3 and 4, an exemplary embodiment of an actuating device 200 includes a motor 204 that powers a three stage transmission 206. In the illustrated embodiment, the motor 204 and the transmission 206 are disposed in a housing 202. In this embodiment, the actuating device is self-contained and modular. Referring again to FIGS. 3 and 4, the transmission 206 has a first stage 310a, a second stage 310b, and a third stage 310c. Each stage 310a-c includes a drive belt 312a-c and at least two sprockets 314a-f. Referring to the first stage 310a, the drive belt 312a is tensioned between a first sprocket 314a and a second sprocket 314b, and the first sprocket 314a is controlled by the motor 204. That is, the motor has a shaft 316 that engages the first sprocket 314a of the first stage 310a. The second sprocket 314b of the first stage 310a is connected to the first sprocket 314c of the second stage 310b. Referring to the second stage 310b, the drive belt 312b is tensioned between the first sprocket 314c and a second sprocket 314d, and the first sprocket 314c of the second stage 310b is controlled by the second sprocket 314b of the first stage 310a. The second sprocket 314d of the second stage 31b is connected to the first sprocket 314e of the third stage 31c. Referring to the third stage 310c, the drive belt 312c is tensioned between the first sprocket 314e and the second sprocket 314f, and the first sprocket 314e is controlled by the second sprocket 314d of the second stage 310b. The actuating arm 208 is attached to the second sprocket 314f of the third stage 310c, such that the movement of the second sprocket 314f of the third stage 310c determines the movement of the actuating arm. That is, the output torque applied by the actuating arm 208 is dependent upon the movement of the second sprocket 314f of the third stage 310c. In this embodiment, the motor 204 powers the transmission 206, which (through the three stages) moves the second sprocket 314f of the third stage 310c and provides the output torque applied by the actuating arm 208. The transmission 206 converts a low torque at the motor 204 to a high torque provided by the actuating arm 208. Each stage 310a-c may be adjusted to change the friction and compliance behavior of the transmission 206, which affects the output torque of the actuating arm 208. That is, the distance between axis points of the sprockets (i.e., the distances X and Y shown on FIG. 3) may be adjusted to change the tension applied to the drive belts 312a-c.

In certain embodiments, a joint position sensor 218 is connected, either directly or indirectly, to the second sprocket 314f of the third stage 310c. The joint position sensor 218 is configured to determine the position of the actuating arm 208 by monitoring the movement of the second sprocket 314f of the third stage 310c (or by monitoring the movement of another member that is connected to the actuating arm 208). In certain embodiments, the joint position sensor 218 is in circuit communication with a controller of the motor 204, such that the controller is able to adjust the performance of the motor 204 based on the position information provided by the joint position sensor 218. The joint position sensor 218 may be, for example, a magnetic field sensor, an optical rotary encoder, rotary type resistive sensors, rotary type capacitive sensors, etc.

The drive belts 312a-c may be any suitable drive belt that is capable of providing power from the motor 204 to the actuating arm 208. The drive belts 312a-c may take a variety of different forms, such as, for example, toothed belts (i.e., timing belts), V belts, flat belts, etc. Belts provide for a quiet transmission, which is advantageous in orthosis, especially pediatric orthosis. In an alternative embodiment, a chain or chains may be used to drive the actuating device 200. In yet another embodiment, gears may be used to drive the actuating device 200.

In the illustrated embodiment of FIGS. 3 and 4, a shaft 320 for holding the second sprocket 314d of the second stage 310b and the first sprocket 314e of the third stage 310c is connected to the housing 202 by two bearings 321a-b. Similarly, a shaft 322 for holding the second sprocket 314b of the first stage 310a, the first sprocket 314c of the second stage 310b, and the second sprocket 314f of the third stage 310c are connected to the housing 202 by two bearings 323a-b. In alternative embodiments, the second sprocket 314b of the first stage 310a and the first sprocket 314c of the second stage 310b may connected to the housing 202 by one shaft (not shown), and the second sprocket 314f of the third stage 310c may be connected to the housing by a separate shaft (not shown). Referring again to the illustrated embodiment, the second stage 310b and the third stage 310c are collocated, which allows for a compact design. That is, the sprockets 314b, 314c rotate at the same speed, and sprocket 314f rotates at a different speed than sprockets 314b, 314c, but all three sprockets 314b, 314c, 314f share the shaft 322. These sprockets 314b, 314c, 314f spinning at different speeds and sharing shaft 322 allows for the design of the actuating device 200 to be compact. In addition, in certain embodiments, the transmission 206 may be adjusted by adjusting the tension of the belts (e.g., by adjusting the distances X and Y, as shown in FIG. 3, between axis points of the sprockets 314a-f). Because the sprockets 314b, 314c, 314f of the second stage 310b and third stage 310c share an axis point (the axis defined by bearings 323a-b), the second stage 310b and third stage 310c may be simultaneously adjusted. For example, in the illustrated embodiment, the shaft 320 (which holds the second sprocket 314d of the second stage 310b and the first sprocket 314e of the third stage 310c) is connected to the housing 202 by adjustable plate 324 and adjustable plate 325, and the adjustable plates 324, 325 may be adjusted to alter the axis of the bearings 321a-b (which is shown in more detail in FIGS. 5B-5C). Adjusting the axis of the bearings 321a-b will alter the distance between the axis points of the sprockets 314a-f, which will alter the belt tension of the second stage 310b and the third stage 310c and adjust the friction and compliance behavior of the transmission.

In an exemplary embodiment, the actuating device 200 is backdrivable due to low friction of the transmission 206. This backdrivability allows a torque applied on the actuating arm 208 (or the second sprocket 314f of the third stage 314c) to drive motion in the transmission 206 and motor 204. The backdrivability of the actuating device allows for a user-in-charge mode of control when used in a lower limb orthosis and is advantageous for rehabilitation because it allows more variety in gait patterns on an inter-subject and intra-subject basis. Accordingly, the ability to adjust the tension of the drive belts 312a-c affects the backdrivability of the actuating device 200 because adjusting the tension in the drive belts changes the level of friction in the transmission 206.

Figure 5A:
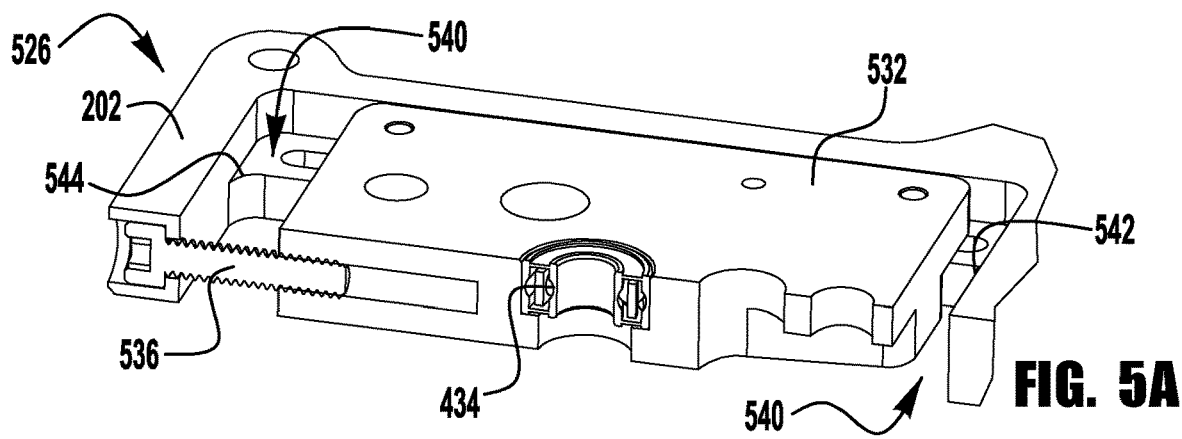
FIG. 5A is a partial cross-sectional view of the exemplary embodiment of the actuating device of FIG. 2 showing a first adjustment mechanism.

The adjustment of the tension of the drive belts 312a-c will be described with reference to FIGS. 5A-5C. In the illustrated embodiment, the stages of the transmission 206 may be adjusted by one or more tension adjustment mechanisms. In the illustrated embodiment, there are three tension adjustment mechanisms: a first adjustment mechanism 526 (FIG. 5A) that adjusts the first stage 310a, and a second adjustment mechanism 528 (FIG. 5B) and a third adjustment mechanism 530 (FIG. 5C) that adjust the second and third stages 310b-c simultaneously. FIG. 5A is a partial cross-sectional view of the first adjustment mechanism 526, which is disposed in the housing 202 at the location where the motor 204 is positioned. The first adjustment mechanism 526 includes an adjustment plate 532 having a bearing 434 (FIGS. 4 and 5A) and an adjustment member 536. The bearing 434 is disposed in the adjustment plate 532, and the shaft 316 (FIGS. 3-4) of the motor 204 is disposed in the bearing 434. The adjustment plate 532 is connected to the housing 202 in an opening 540, such that the adjustment plate 532 is movable within the opening 540. The adjustment member 536 is configured to move the adjustment plate 532 to a desired position within the opening 540. In the illustrated embodiment, the adjustment member 536 is a screw. In this embodiment, the screw may be tightened to move the adjustment plate 532 toward wall 544, and the screw may be loosened to move the adjustment plate toward wall 542. In alternative embodiments, the adjustment member 536 may be any suitable member that is capable of moving the adjustment plate 532 to a desired location within the opening 540, such as, for example, ball screws, lead-screws, etc. In other embodiments, the adjustment mechanisms 526, 528, 530 may be replaced with other suitable belt tensioning mechanism, such as, for example, idler pulleys, additional belt sprockets, etc., which may or may not be spring loaded.

Figure 5B:
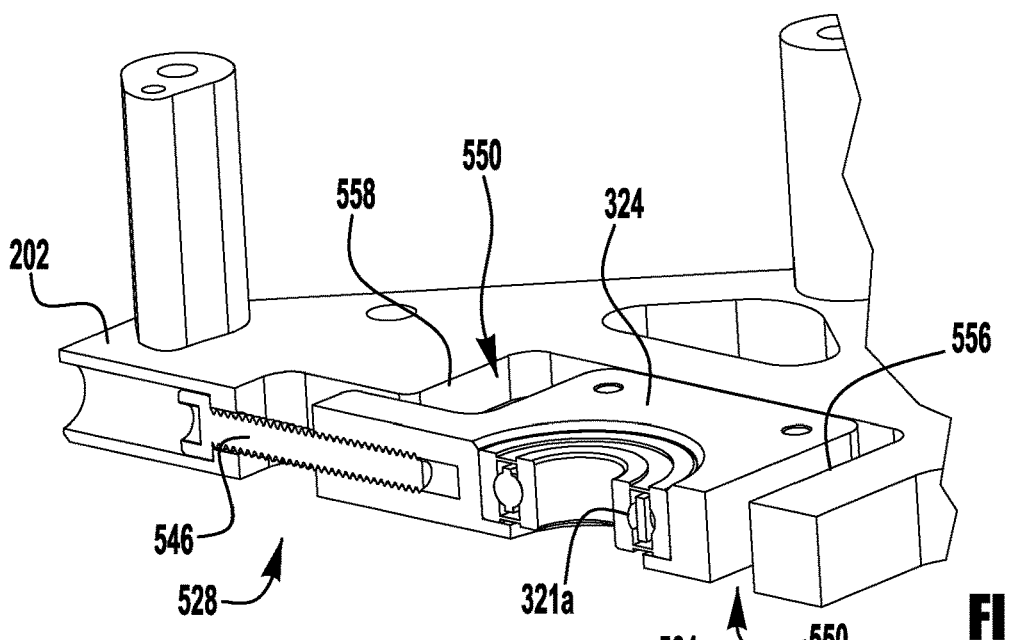
FIG. 5B is a partial cross-sectional view of the exemplary embodiment of the actuating device of FIG. 2 showing a second adjustment mechanism.

FIG. 5B illustrates a cross-sectional view of the second adjustment mechanism 528. In an exemplary embodiment, the second adjustment mechanism 528 includes an adjustment plate 324 having a bearing 321a (FIGS. 3-4 and 5B) and an adjustment member 546. The adjustment plate 324 is connected to the housing 202 in an opening 550, such that the adjustable plate 324 is movable within the opening 550. The adjustment member 546 is configured to move the adjustment plate 324 to a desired position within the opening 550. In this embodiment, the adjustment member 546 is a screw. The screw may be tightened to move the adjustment plate 324 toward wall 558, and the screw may be loosened to move the adjustment plate toward wall 556. In alternative embodiments, the adjustment member 546 may be any suitable member that is capable of moving the adjustment plate 324 to a desired location within the opening 550, such as, for example, ball screws, leadscrews, etc.

Figure 5C:
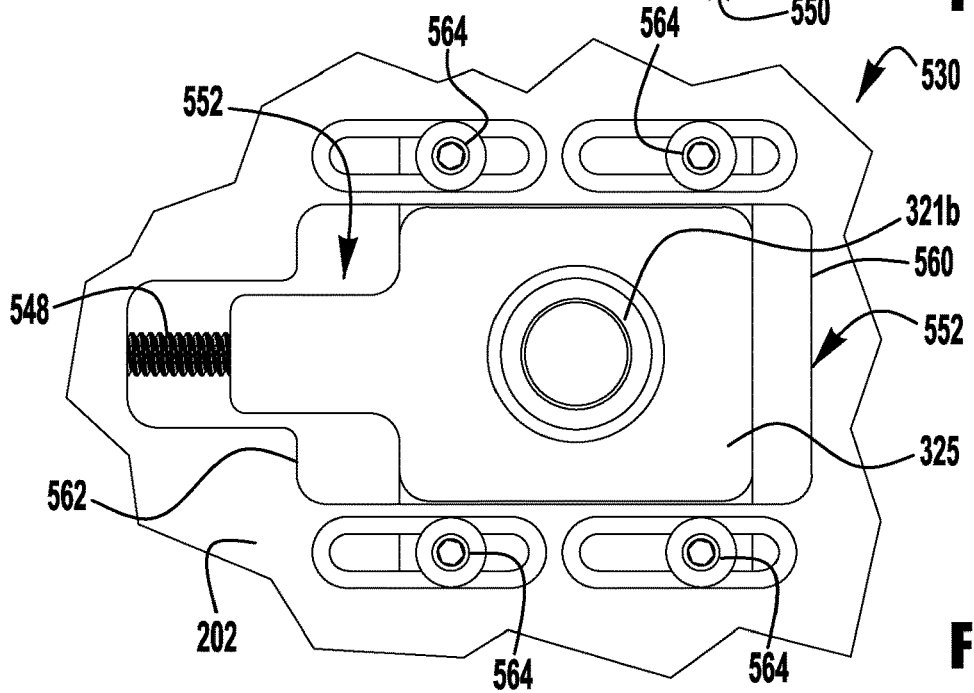
FIG. 5C is a partial top view of the exemplary embodiment of the actuating device of FIG. 2 showing a third adjustment mechanism.

FIG. 5C illustrates a top view of the third adjustment mechanism 530. In an exemplary embodiment, the third adjustment mechanism 530 includes an adjustment plate 325 having a bearing 321b (FIGS. 3-4 and 5B) and an adjustment member 548. The adjustment plate 325 is connected to the housing 202 in an opening 552, such that the adjustable plate 325 is movable within the opening 552. The adjustment member 548 is configured to move the adjustment plate 325 to a desired position within the opening 552. In this embodiment, the adjustment member 548 is a screw. The screw may be tightened to move the adjustment plate 325 toward wall 562, and the screw may be loosened to move the adjustment plate toward wall 560. In alternative embodiments, the adjustment member 548 may be any suitable member that is capable of moving the adjustment plate 325 to a desired location within the opening 552, such as, for example, ball screws, leadscrews, etc. In an exemplary embodiment, the third adjustment mechanism 530 includes four locking members 564 that are used to lock the adjustment plate 325 in a desired position. That is, the adjustment member 548 may be used to move the adjustable plate 325 to a desired position within the opening 552, and the locking members 564 may be used to lock the adjustable plate in the desired position. In the illustrated embodiment, the locking members 564 are screws. In alternative embodiments, the locking members may be, for example, pins, slots, ratchet mechanisms, etc. The third adjustment mechanism 530 may include, for example, one locking member, two locking members, three locking members, four locking members, etc. The first adjustment mechanism 526 and the second adjusting mechanism 528 may also include one or more locking members (e.g., the locking members 564 shown in FIG. 5C) that are configured to lock adjustment plates 532, 324 in a desired position.

The adjustment mechanisms 526, 528, 530 may include a biasing member (not shown), such as a spring, that may be used to keep the adjustable plate 532, 324, 325 in a default position. In other words, the biasing member may be used to keep the adjustment plates 532, 324, 235 in default positions, but the positions of the adjustment plates may be adjusted by the adjustment members 536, 546, 548.

Referring to FIGS. 3, 4, and 5A, the position of the adjustment plate 532 affects the tension of the drive belt 312a of the first stage 310a of the transmission 206. The first sprocket 314a of the first stage 310a is connected to the shaft 316, and the shaft 316 is disposed in the bearing 434 on the adjustment plate 532. The second sprocket 314b of the first stage 310a is connected to a shaft 322 that is disposed in the bearing 323a-b. The distance X (FIG. 3) between the shafts 316, 322 affects the tension of the drive belt 312a. By adjusting the position of the adjustment plate 532, the location of the shaft 316 is moved, and the distance X between the shafts 316, 322 is altered. Altering the distance X adjusts the tensions of the drive belt 312a. The farther the shafts 316, 322 are away from each other, the more tension in the drive belt 312a.

Referring to FIGS. 3, 4, 5B, and 5C, the position of adjustment plates 324, 325 affect the tension of the drive belts 312b, 312c of the second stage 310b and third stage 310c of the transmission 206. In the illustrated embodiment, the adjustment plates 324, 325 are configured to align and move with each other such that the bearings 321a, 321b remain aligned with each other. The shaft 320 connects to adjustment plate 324 by the bearing 321a and to adjustment plate 325 by the bearing 321b. The tension of the drive belts 312b, 312c is dependent upon the distance Y between the shaft 320 and the shaft 322. By adjusting the adjustment plates 324, 325, the location of the shaft 320 is moved, and the distance Y between the shafts 320, 322 is altered. Altering the distance Y adjusts the tension of the drive belts 312b, 312c. In this embodiment, the second stage 310b and the third stage 310c are adjusted simultaneously. In alternative embodiments, the actuating device 200 may be configured such that the second stage 310b and the third stage 310c are adjusted independent of each other.

While the illustrated embodiment utilizes tension adjustment mechanisms 526, 528, 530 to adjust the tension of the drive belts 312a, 313b, 312c, any suitable means for adjusting the tension of the drive belts may be utilized. For example, in alternative embodiments, idler pulleys, additional belt sprockets, etc. can be used for adjusting the tensions of the drive belts. In these alternative embodiments, the pulleys, additional belt sprockets, etc. can optionally be spring loaded.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions, such as alternative materials, structures, configurations, methods, devices and components, alternatives as to form, fit and function, etc. may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions, even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated.

While various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. An actuating device for orthosis comprising:
   a housing;
   a motor having a motor shaft;
   a transmission disposed in the housing and operatively connected to the motor such that the motor provides power to the transmission, the transmission comprising:
      a first stage having a first sprocket, a second sprocket, and a first drive belt tensioned by the first sprocket and the second sprocket, wherein the first sprocket is attached to the motor shaft;
      a second stage having a third sprocket, a fourth sprocket, and a second drive belt tensioned by the third sprocket and the fourth sprocket, wherein the third sprocket is attached to the second sprocket of the first stage;
      a third stage having a fifth sprocket and a sixth sprocket, and a third drive belt tensioned by the fifth sprocket and the sixth sprocket, wherein the fifth sprocket is attached to the fourth sprocket of the second stage;
      a first shaft, wherein the second sprocket, the third sprocket, and the sixth sprocket are attached to the first shaft, wherein the sixth sprocket is configured to rotate relative to the first shaft at a different speed than the second sprocket and the third sprocket; and
      a second shaft, wherein the fourth sprocket and the fifth sprocket are attached to the second shaft;
   an actuating arm operatively connected to the sixth sprocket of the third stage of the transmission such that the power provided to the transmission by the motor causes the actuating arm to provide an output torque.

2. The actuating device of claim 1, wherein a distance between the motor shaft and the first shaft is adjustable.

3. The actuating device of claim 1, wherein a distance between the first shaft and the second shaft is adjustable.

4. The actuating device of claim 1, wherein the motor is a brushless DC motor.

5. The actuating device of claim 1, wherein the motor comprises a controller that is configured to adjust an output of the motor.

6. The actuating device of claim 5, wherein the motor comprises a Hall effect sensor that is configured to be in circuit communication with the controller.

7. The actuating device of claim 5, further comprising a joint position sensor that is configured to monitor the movement of the actuating arm, wherein the joint position sensor is in circuit communication with the controller of the motor.

8. The actuating device of claim 7, wherein the joint position sensor is a magnetic field sensor.

9. The actuating device of claim 1, further comprising a first adjustment mechanism that is configured to move a position of the motor shaft.

10. The actuating device of claim 9, further comprising a second adjustment mechanism that is configured to move a position of the second shaft.

11. The actuating device of claim 10, further comprising a third adjustment mechanism that is aligned with the second adjustment mechanism, wherein the second shaft is attached to both the second adjustment mechanism and the third adjustment mechanism, wherein the second adjustment mechanism and the third adjustment mechanism are moved together to move the position of the second shaft.

12. The actuating device of claim 11, wherein at least one of the first adjustment mechanism, the second adjustment mechanism, and the third adjustment mechanism comprises one or more locking members that are configured to lock at least one of the motor shaft and the second shaft in a desired position.

13. The actuating device of claim 1, wherein the transmission is backdrivable such that an input torque applied by a user to the actuating arm drives motion in the transmission.

14. The actuating device of claim 1, wherein the first drive belt, the second drive belt, and the third drive belt are chains.

15. An actuating device for orthosis comprising:
   a housing;
   a motor having a motor shaft;
   a transmission disposed in the housing and operatively connected to the motor such that the motor provides power to the transmission, the transmission comprising:
      a first shaft;
      a second shaft;
      a first stage having a first drive belt, wherein the first drive belt is connected to the motor shaft of the motor and the first shaft;
      a second stage having a second drive belt, wherein the second drive belt is connected to the first shaft and the second shaft;
      a third stage having a third drive belt, wherein the third drive belt is connected to the first shaft and the second shaft;
   an actuating arm operatively connected to the third stage of the transmission such that the power provided to the transmission by the motor causes the actuating arm to provide an output torque;
   wherein a location of at least one of the motor shaft, the first shaft, and the second shaft is adjustable relative to the housing such that a distance between the motor shaft and the first shaft is adjustable and such that a distance between the first shaft and the second shaft is adjustable.

16. The actuating device of claim 15, wherein the transmission is backdrivable such that an input torque applied by a user to the actuating arm causes the motor shaft to rotate.

17. An actuating device for orthosis comprising:
   a housing;
   a motor disposed in the housing;
   a transmission disposed in the housing and operatively connected to the motor such that the motor provides power to the transmission, the transmission comprising:
      a first stage having a first sprocket, a second sprocket, and a first drive belt tensioned by the first sprocket and the second sprocket, wherein the first sprocket is attached to the motor shaft;
      a second stage having a third sprocket, a fourth sprocket, and a second drive belt tensioned by the third sprocket and the fourth sprocket, wherein the third sprocket is attached to the second sprocket of the first stage;
      a third stage having a fifth sprocket and a sixth sprocket, and a third drive belt tensioned by the fifth sprocket and the sixth sprocket, wherein the fifth sprocket is attached to the fourth sprocket of the second stage;
      a first shaft, wherein the second sprocket, the third sprocket, and the sixth sprocket are attached to the first shaft, wherein the sixth sprocket is configured to rotate relative to the first shaft at a different speed than the second sprocket and the third sprocket; and a second shaft, wherein the fourth sprocket and the fifth sprocket are attached to the second shaft;

an actuating arm operatively connected to the sixth sprocket of the third stage of the transmission such that the power provided to the transmission by the motor causes the actuating arm to provide an output torque;

wherein the transmission is backdrivable such that an input torque applied by a user to the actuating arm causes the motor shaft to rotate.

18. The actuating device of claim 17, wherein the second stage and the third stage are collocated.

19. The actuating device of claim 17, further comprising a controller and a joint position sensor, wherein the joint position sensor is in circuit communication with the controller, and wherein the joint position sensor is configured to monitor the movement of the actuating arm.

20. The actuating device according to claim 15, further comprising a first adjustment mechanism that is configured to move the position of the motor shaft relative to the housing, a second adjustment mechanism, and a third adjustment mechanism, wherein the third adjustment mechanism is aligned with the second adjustment mechanism, wherein the second shaft is attached to both the second adjustment mechanism and the third adjustment mechanism, and wherein the second adjustment mechanism and the third adjustment mechanism are moved together to move the position of the second shaft relative to the housing, and wherein at least one of the first adjustment mechanism, the second adjustment mechanism, and the third adjustment mechanism comprises one or more locking members that are configured to lock at least one of the motor shaft and the second shaft in a desired position relative to the housing.

21. The actuating device according to claim 15, further comprising a first adjustment mechanism that is configured to move the position of the motor shaft relative to the housing, a second adjustment mechanism, and a third adjustment mechanism, wherein the third adjustment mechanism is aligned with the second adjustment mechanism, wherein the first shaft is attached to both the second adjustment mechanism and the third adjustment mechanism, and wherein the second adjustment mechanism and the third adjustment mechanism are moved together to move the position of the first shaft relative to the housing, and wherein at least one of the first adjustment mechanism, the second adjustment mechanism, and the third adjustment mechanism comprises one or more locking members that are configured to lock at least one of the motor shaft and the first shaft in a desired position relative to the housing.

22. The actuating device according to claim 15, further comprising a first adjustment mechanism and a second adjustment mechanism, wherein the second adjustment mechanism is aligned with the first adjustment mechanism, wherein the first shaft is attached to both the first adjustment mechanism and the second adjustment mechanism, and wherein the first adjustment mechanism and the second adjustment mechanism are moved together to move the position of the first shaft relative to the housing, and wherein the first adjustment mechanism or the second adjustment mechanism comprises one or more locking members that are configured to lock the first shaft in a desired position relative to the housing.

* * * * *